US012675759B2

(12) United States Patent
Hora et al.

(10) Patent No.: US 12,675,759 B2
(45) Date of Patent: Jul. 7, 2026

(54) DIGITAL EMPLOYEE EXPERIENCE IMPROVEMENT BASED ON DE-IDENTIFIED PRODUCTIVITY DATA SIGNALS

(71) Applicant: Grammarly, Inc., San Francisco, CA (US)

(72) Inventors: Kashish Hora, New York, NY (US); Oleksiy Shevchenko, San Francisco, CA (US); Rahul Kadyan, Vancouver (CA); Tushar Janefalkar, San Mateo, CA (US)

(73) Assignee: Superhuman Platform Inc.

( * ) Notice: Subject to any disclaimer, the term of this patent is extended or adjusted under 35 U.S.C. 154(b) by 0 days.

(21) Appl. No.: 18/620,828

(22) Filed: Mar. 28, 2024

(65) Prior Publication Data

US 2024/0242158 A1     Jul. 18, 2024

Related U.S. Application Data

(63) Continuation-in-part of application No. PCT/US2023/024572, filed on Jun. 6, 2023.
(Continued)

(51) Int. Cl.
*G06Q 10/0639*        (2023.01)

(52) U.S. Cl.
CPC ................................. *G06Q 10/0639* (2013.01)

(58) Field of Classification Search
CPC .......................................... G06Q 10/00–50/00
(Continued)

(56) References Cited

U.S. PATENT DOCUMENTS 8,171,117 B2 * 5/2012 Rhodes .................. G06Q 10/06
                                                        709/227
9,208,474 B2 * 12/2015 Mckeown .......... G06Q 10/1057
(Continued)

OTHER PUBLICATIONS

International Search Report and Written Opinion for Application No. PCT/US2025/021691 dated Jun. 6, 2025 (14 pages).
(Continued)

*Primary Examiner* — Alan S Miller
(74) *Attorney, Agent, or Firm* — Van Hoven PC; Jordan Becker

(57)            ABSTRACT

Embodiments provide a computer that includes one or more processors and instructions stored on one or more memory devices. The one or more processors executes the instructions to monitor, using one or more extractor application programming interfaces (APIs), a plurality of streams associated with user interactions with the computer, each of the plurality of streams including one or more events or activities associated with the user interactions, the user interactions being interactions with one or more different applications or platforms of the computer. The processor may extract contents and contexts from the plurality of streams using the one or more extractor APIs. The processor further determines one or more workflows associated with the user, the one or more workflows including the extracted contents and contexts, the workflows indicating the user interactions with the computer during a time series comprising a plurality of timestamps associated with times at which the user performed the interactions with the computer. The processor stores the one or more the workflows at the user computer. The processor determines one or more chunks of the one or more workflows, each chunk being a subpart of one of the one or more workflows and corresponding to a set of the plurality of timestamps associated with the subpart, each chunk including the content and contexts of the one or more (Continued)

800

Monitor one or more streams associated with user interactions with a computer — 802

Extract contents and/or contexts from the one or more streams — 804

Determine one or more workflows of the user — 806

Determine one or more chunks from the one or more workflows — 808

Evaluate the one or more chunks — 810

Automate one or more subsequent workflows — 812 workflows associated with the set of the plurality of time-stamps. The processors evaluates the one or more chunks, the evaluating creating one or more inferred actions using the content and contexts of the one or more workflows associated with the set of the plurality of timestamps and automates one or more subsequent workflows associated with the user based on the one or more inferred actions.

20 Claims, 12 Drawing Sheets

Related U.S. Application Data

(60) Provisional application No. 63/349,844, filed on Jun. 7, 2022.

(58) Field of Classification Search
USPC ............................................... 705/7.11–7.42
See application file for complete search history.

(56) References Cited

U.S. PATENT DOCUMENTS

| | | | | |
|---|---|---|---|---|
| 10,810,530 | B2 * | 10/2020 | Geisler | G06Q 10/08 |
| 11,418,571 | B1 * | 8/2022 | Singh | H04L 67/535 |
| 2002/0129139 | A1 * | 9/2002 | Ramesh | G06Q 10/0639 |
| | | | | 709/224 |
| 2010/0299180 | A1 * | 11/2010 | Tsatalos | G06Q 10/10 |
| | | | | 705/7.36 |
| 2011/0252226 | A1 * | 10/2011 | Francis | H04L 63/0421 |
| | | | | 713/150 |
| 2017/0193420 | A1 * | 7/2017 | Tiwari | G06Q 10/06398 |
| 2018/0101806 | A1 * | 4/2018 | Adepoju | G06Q 10/06398 |
| 2018/0165604 | A1 * | 6/2018 | Minkin | G06Q 10/06 |
| 2019/0205148 | A1 * | 7/2019 | Schur | G06F 9/453 |
| 2019/0205839 | A1 * | 7/2019 | Dotan-Cohen | H04L 67/535 |
| 2020/0151630 | A1 * | 5/2020 | Shakhnovich | G06Q 10/063 |
| 2022/0293107 | A1 * | 9/2022 | Leaman | G06Q 30/0271 |
| 2022/0343250 | A1 * | 10/2022 | Tremblay | G06F 3/0482 |
| 2022/0365861 | A1 * | 11/2022 | DeFilippo | G06F 9/547 |

OTHER PUBLICATIONS

Eric Stamber, International Preliminary Report on Patentability, Application No. PCT/US2023/024572, dated Oct. 23, 2024, 17 pages, pub. by the USPTO, Alexandria, VA.

Lee, Khang Ha, International Search Report and Written Opinion, Application No. PCT/US2023/024572, Sep. 21, 2023, Korean Intellectual Property Office, Cheongsa-ro, Seo-gu, Daejeon, Republic of Korea, 12 pages.

MDN Contributors, Canvas API, MDN, Feb. 18, 2023, 04 pages, https://developer.mozilla.org/en-us/docs/Web/API/Canvas_API, Mozilla Corporation, retrieved May 8, 2024, 4 pages.

Andrew Lock, Running JavaScript inside a .NET app with JavaScriptEngineSwitcher, .NET Escapades, Apr. 19, 2022, 09 pages, https://andrewlock.net/running-javascript-in-a-dotnet-app-with-javascriptengineswitcher/, retrieved May 8, 2024, 9 pages.

* cited by examiner

200

| Log Events | Raw Data Source | Events | 1st Order Signals (Per day) | 2nd Order Signals (Per day or Per week) | 3rd Order Signals (Over multiple days or weeks) |
|---|---|---|---|---|---|
| | Calendar (synced to computer) | | | Calendar | Similar working hours everyday / Consistency |
| {"action":"continuous","duration":98,"date":"2022-03-22T01:20:24Z","type":"userInput","version":0} | Keyboard/Pointer Activity | Continuous usage | Total continuous activity per day | Time in meetings / Messaging / Time Spent Communicating | Similar time in meetings over time |
| {"action":"sleep","date":"2022-03-16T05:16:39Z","type":"system","version":0} | Wake/Sleep/Screensaver | Sleep | Working hours per day (e.g. 9am-5pm) | Wake/Sleep / Application Activity | Long working hours for multiple weeks |
| {"action":"wake","date":"2022-03-16T15:23:24Z","type":"system","version":0} | | Wake | | Working hours per day (e.g. 9am-5pm) / Time spent working on the computer (# of hours) | Communication outside working hours / Burnout |
| | | | Time in meetings | Time spent in scheduled v/s ad hoc meetings / Calendar | Time spent working on the computer (# of hours) |
| {"action":"micOn","date":"2022-03-22T04:48:46Z","type":"system","version":0} | Microphone | On | | Time in meetings | |
| {"action":"micOff","date":"2022-03-22T00:43:25Z","type":"system","version":0} | | Off | | Meeting your goal of / Calendar | |

FIG. 6A

| Log Events | Raw Data Source | Events | 1st Order Signals (Per day) | 2nd Order Signals (Per day or Per week) | 3rd Order Signals (Over multiple days or weeks) |
|---|---|---|---|---|---|
| | | Speaking | | Application Activity — scheduled focus time | |
| {"action":"cameraOn","date":"2022-03-22T04:48:40Z","type":"system","version":0} | Camera On/Off | On | | Time in meetings — Meeting | |
| {"action":"cameraOff","date":"2022-03-22T04:48:52Z","type":"system","version":0} | | Off | | Application Activity — engagement score | |
| | Application Activity | | Time spent in each application per day | | |
| {"action":"gainedFocus","date":"2022-03-22T04:48:41Z","classification":"other","type":"application","bundleId":"com.apple.Safari","version":0} | | Gained focus (browser - "other" classification) | | | |
| | | Gained focus (browser - "productivity" classification) | Longest stretch of focus time | | |
| {"action":"gainedFocus","date":"2022-03-22T04:31:16Z","classification":"productivity","type":"application","bundleId":"com.apple.Safari","version":0} | | | | 1-1 Msgs on Slack | |
| {"action":"gainedFocus","date":"2022-03-22T04:48:55Z","classification":"webSearch","type":"application","bundleId":"com.apple.Safari","version":0} | | Gained focus (browser) | | Multi-person Msgs on Slack — Individual Conversations | |

*FIG. 6B*

| Log Events | Raw Data Source | Events | 1st Order Signals (Per day) | 2nd Order Signals (Per day or Per week) | 3rd Order Signals (Over multiple days or weeks) |
|---|---|---|---|---|---|
| {"action":"gainedFocus","date":"2022-03-22T04:33:33Z","type":"application","bundleId":"com.apple.dt.Xcode","version":0} | | Gained focus (non-browser application) | | Calendar - Create a coverage score based on org-chart. Could be something like what percentage of departments are you connected with. Whom are you meeting? | |
| | | | | Calendar - Are you only meeting people outside your company? For example - in a sales/consulting role. This could lead to disconnectedness and isolation. | |
| {"action":"started","date":"2022-03-23T16:45:44Z","recipients":[{"name":"Heidi Williams","type":"individual"},{"name":"Kashish Hora","type":"individual"}],"type":"message","bundleId":"com.tinyspeck.slackmacgap","version":0} | Messaging | Slack: Started message | | Slack - Are you checking out slack groups? Company Connectedness - Are you connected to the company as a whole? | |

*FIG. 6C*

| Log Events | Raw Data Source | Events | 1st Order Signals (Per day) | 2nd Order Signals (Per day or Per week) | 3rd Order Signals (Over multiple days or weeks) |
|---|---|---|---|---|---|
| {"action":"started","date":"2022-03-23T16:46:21Z", "recipients":[{"name":"Ryan Grimm","type": "unknown"}],"type","message","bundleId": "com.apple.mail","version":0} | | Mail app: Started message | | Calendar Application Activity - Do you attend company all-hands or town halls? | |
| | | Gmail: Started message | | | |
| | External Devices | | | | |
| | | Mouse - connected | | | |
| | | Mouse - disconnected | | | |
| | | Keyboard - connected | | | |
| | | Keyboard - disconnected | | | |
| | Network Type | | | | |
| {"action":"connected","isExpensive":false,"date": "2022-03-23T04:25:28Z","type":"network","isCellular": false,"version":0} | | WiFi | | | |
| {"action":"connected","isExpensive":true,"date": "2022-03-23T04:25:28Z","type":"network","isCellular": true,"version":0} | | Tethering | | | |
| {"action":"connected","isExpensive":true,"date": "2022-03-23T04:25:28Z","type":"network","isCellular": false,"version":0} | | Tethering over WiFi | | | |

*FIG. 6D*

| Log Events | Raw Data Source | Events | 1st Order Signals (Per day) | 2nd Order Signals (Per day or Per week) | 3rd Order Signals (Over multiple days or weeks) |
|---|---|---|---|---|---|
| {"action":"disconnected","date":"2022-03-23T04:26:06Z","type":"network","version":0} | Network Speed | None | | | |
| | | Speed report | | | |
| | Displays | | | | |
| {"action":"screenAdded","date":"2022-03-16T17:03:47Z","type":"system","version":0} | | Screen added | | | |
| {"action":"screenRemoved","date":"2022-03-16T17:05:27Z","type":"system","version":0} | | Screen removed | | | |
| | Power Source | | | | |
| {"action":"unplugged","date":"2022-03-22T00:41:02Z","type":"system","version":0} | | Unplugged | | | |
| {"action":"pluggedIn","date":"2022-03-21T23:04:11Z","type":"system","version":0} | | Plugged in | | | |

*FIG. 6E*

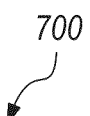
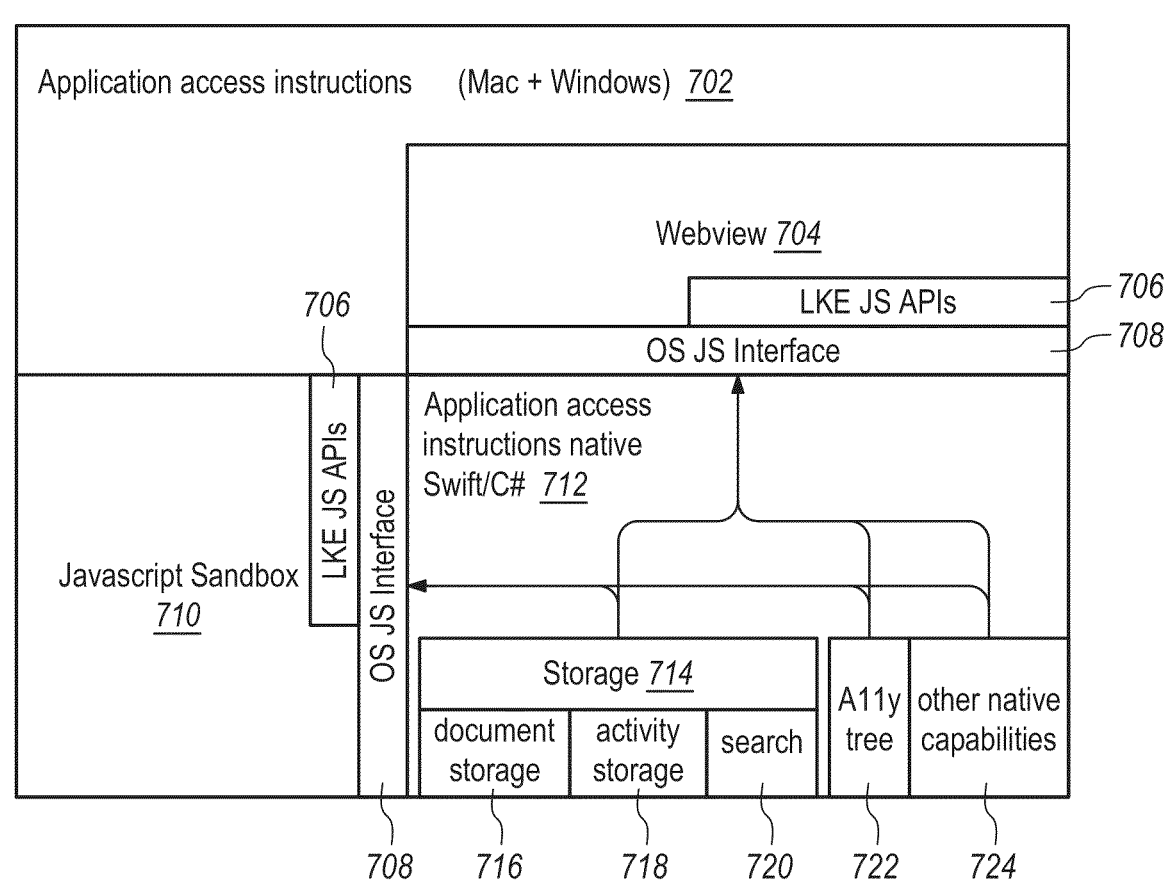
FIG. 7

*800*

| Monitor one or more streams associated with user interactions with a computer | 802 |

| Extract contents and/or contexts from the one or more streams | 804 |

| Determine one or more workflows of the user | 806 |

| Determine one or more chunks from the one or more workflows | 808 |

| Evaluate the one or more chunks | 810 |

| Automate one or more subsequent workflows | 812 |

DIGITAL EMPLOYEE EXPERIENCE IMPROVEMENT BASED ON DE-IDENTIFIED PRODUCTIVITY DATA SIGNALS

BENEFIT CLAIM

This application claims the benefit under 35 U.S.C. § 120 as a continuation-in-part (CIP) of PCT international application PCT/US2023/024572, filed Jun. 6, 2023, which claims the benefit of provisional application 63/349,844, filed Jun. 7, 2022, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

TECHNICAL FIELD

One technical field of the present disclosure is artificial intelligence and machine learning as applied to data signals representing the use of computers, application programs, and computer services. Another technical field is the computer-implemented generation of instructional information, such as behavioral coaching.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

The recent shift to remote work has created novel workplace challenges. For knowledge workers, fully remote work arrangements and hybrid remote/in-person work arrangements have become widely used. In these arrangements, managers of knowledge workers who work at home cannot directly observe the physical work arrangement, hours of work, means of work, or other aspects of productivity that may be important to a business enterprise. Furthermore, remote knowledge workers may adopt, intentionally or not, work habits that degrade mental health, physical health, or productivity. Example issues include avoidance of work or interaction with other workers, attrition or resignation, burnout, and low productivity.

Virtually all knowledge workers of this kind use networked personal computers to connect to an enterprise, office, or workgroup. Consequently, enterprises and management personnel have begun searching for computer-implemented solutions to help understand how remote personnel are working and to support positive changes in mental health or physical health. Research indicates that employees are feeling disengaged, burned out, and disconnected. Managers don't know how to easily gauge team health or improve it in a remote setting. Executives diagnose and fix problems in their organization through managers.

One approach is to use a server or software to periodically transmit surveys to knowledge workers that request the worker to respond to a series of questions about work habits. However, surveys usually have a lower than desired response rate and may be delivered at times that are not well synchronized to detect actual employee behavior or habits at the time they occur. Furthermore, some workers have received too many surveys in recent years and may not respond at all or may provide incorrect or irrelevant input just to complete the survey and dispense with it. Surveys tend to be expensive, provide noisy data, and lag behind the need to change behavior or arrangements.

Therefore, the relevant art has an unfulfilled need for an improved, machine-driven, real-time approach to help managers understand and improve their teams' health and performance, potentially using artificial intelligence to deliver relevant metrics and just-in-time coaching. At the same time, personal privacy is important, and enterprises that adopt an intrusive monitoring approach or that collect data concerning computer use that is perceived to be private can be perceived as unethical, non-competitive in the labor marketplace, or even violate laws or regulations. Therefore, any computer-implemented solution to the problem of knowing what employees are doing or how they work must respect personal privacy and must implement technical means of doing so.

SUMMARY

The appended claims may serve as a summary of the invention.

BRIEF DESCRIPTION OF THE DRAWINGS

In the drawings:

FIG. 6A-6E illustrates Table 2 of this disclosure, which shows a correlation of example events, sources, and signals, according to some embodiments.

FIG. 7 illustrates an example computer system architecture according to some embodiments.

DETAILED DESCRIPTION

Figure 1:
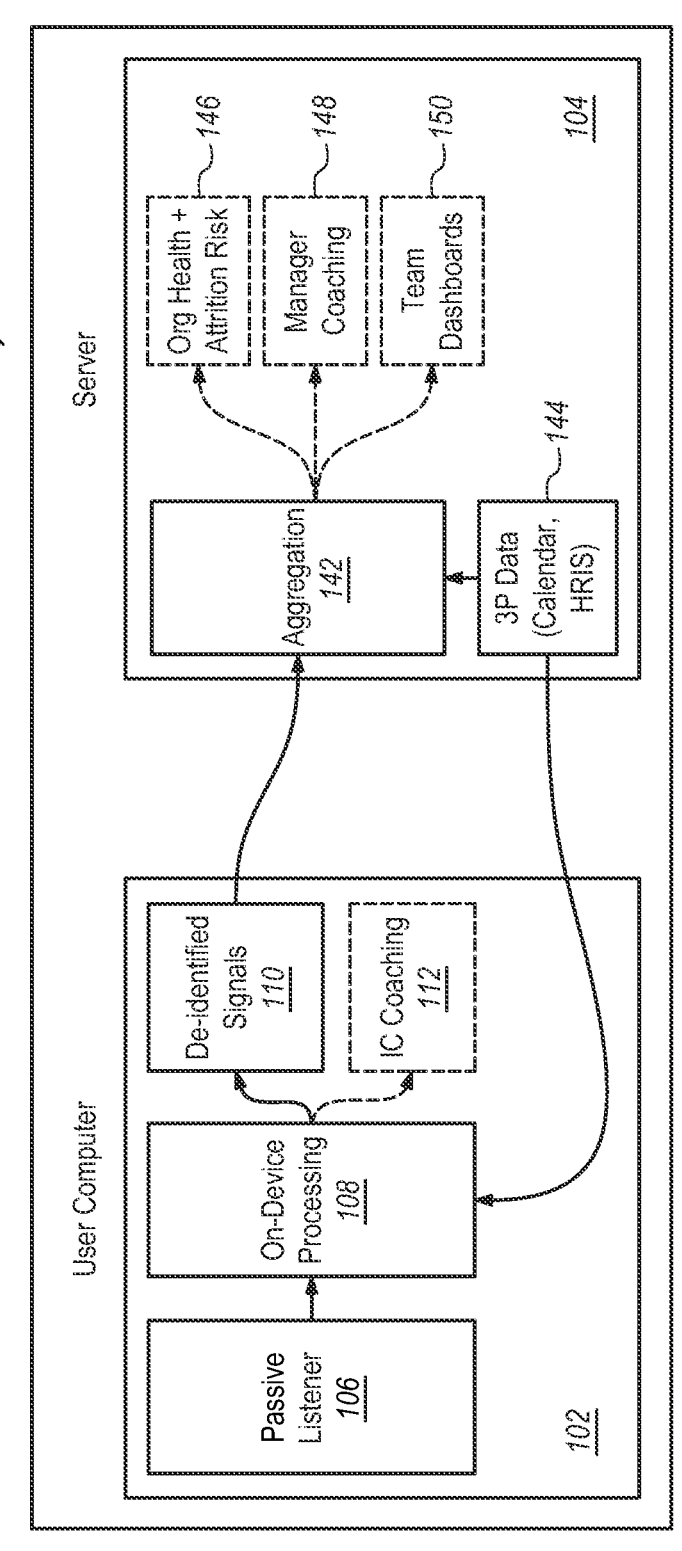
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1. General Overview

In one embodiment, the disclosure provides a computer-implemented digital worker data analysis system capable of collecting data concerning worker interaction with work systems, analyzing signal data representing the interaction or use, and outputting analytical data and/or recommendations for remediation of issues. In one approach, the system is programmed to create and store analytical data that can be presented using charts, graphs, dashboards, or other visualizations to enable leaders and managers to understand how remote workers and/or hybrid workers are interacting with systems, conducting work, achieving productivity, or experiencing negative issues. In another approach, the system is programmed to act as a digital experience coach capable of transmitting messages, notifications, information, or resources to remote knowledge workers to improve how they handle remote work and/or remote work environments.

In one embodiment, at an end-user computer of a knowledge worker, a software application listens to operating system events and collects digital signals that are associated with the use of the computer, interaction in meetings or calls, the use of applications, networks, websites, and SaaS services, and a variety of other signals that relate to the user's work, productivity, and/or work environment. All signals are collected locally on the end-user computer and stored in a local database on that machine. Signal data can be de-identified or anonymized, abstracted, or aggregated and then transmitted in a form that is not personally identifiable to a server computer over a network. At the server computer, the signal data is evaluated using one or more trained machine learning models that output recommendations for responsive action, coupled with corresponding confidence values. Based on the confidence values or programmatic rules, an instruction application is programmed to select one or more messages, notifications, information, or resources and to present the one or more messages, notifications, information, or resources to the end-user computer.

2. Structural & Functional Overview

In one embodiment, the disclosure provides a digital employee experience tool to improve employee engagement, productivity, and connectedness. Embodiments can assist organizations to address challenges of employee engagement, productivity, and connectedness while in a remote working environment. In one embodiment, one or more programs, signal sources, databases, algorithms, and machine learning models interoperate to assist organizations in ensuring employees are engaged and energetic about their work, helping employees maintain a balance between being productive without burning out and fostering a culture of belonging and connectedness. Existing tools rely on self-reporting or passive observation, both of which are ineffective at large scale.

In the disclosure, the term "remote working environment" can refer to working arrangements for any organization where a significant portion of personnel or teams do not physically appear in the same building for at least two days of the workweek. Research indicates that at this level of in-person work, employee wellness problems start emerging.

In an embodiment, an on-device software component is programmed to passively observe and collect multiple signals that research, investigation, and inventiveness indicate to be predictors of employee wellness, as measured through attrition. As an example, an embodiment can be programmed to determine when users are working outside their normal business hours based on their calendar and use that as a leading indicator of burnout. Or an embodiment can be programmed to determine how often a user participates in instant messenger software conversations and meetings, which could be a leading indicator of engagement. In this disclosure, the various metrics that the on-device software component collects are termed "signals" or "signal data." In an embodiment, signals are processed on-device, such as on a worker's computer when the worker is in a remote or home location and not on a separate networked server. When the signals are transmitted to servers, they are de-identified and aggregated so that they cannot be associated with any specific individual.

For leaders, an embodiment can be programmed to provide a virtual heartbeat into how the organization is performing, how it is reacting to changes in policies, and benchmarking against other organizations or across teams. An embodiment can be programmed to receive and process queries to the signals or data derived from the signals in a meaningful way so leaders can see the data in a way that is most intuitive or relevant to them. For managers, an embodiment can be programmed to provide the same functionality but specific to a functional team of people, users, computers, or accounts. Embodiments can be programmed to provide coaching opportunities for managers by aggregating their signals from team members observing trends and aggregating from best practices observed in other successful teams. For individual contributors, an embodiment can be programmed to deliver personalized coaching by analyzing their signals on-device and observing trends without sending anything to a networked server.

2.1 Distributed Computer System Examples

Figure 2:
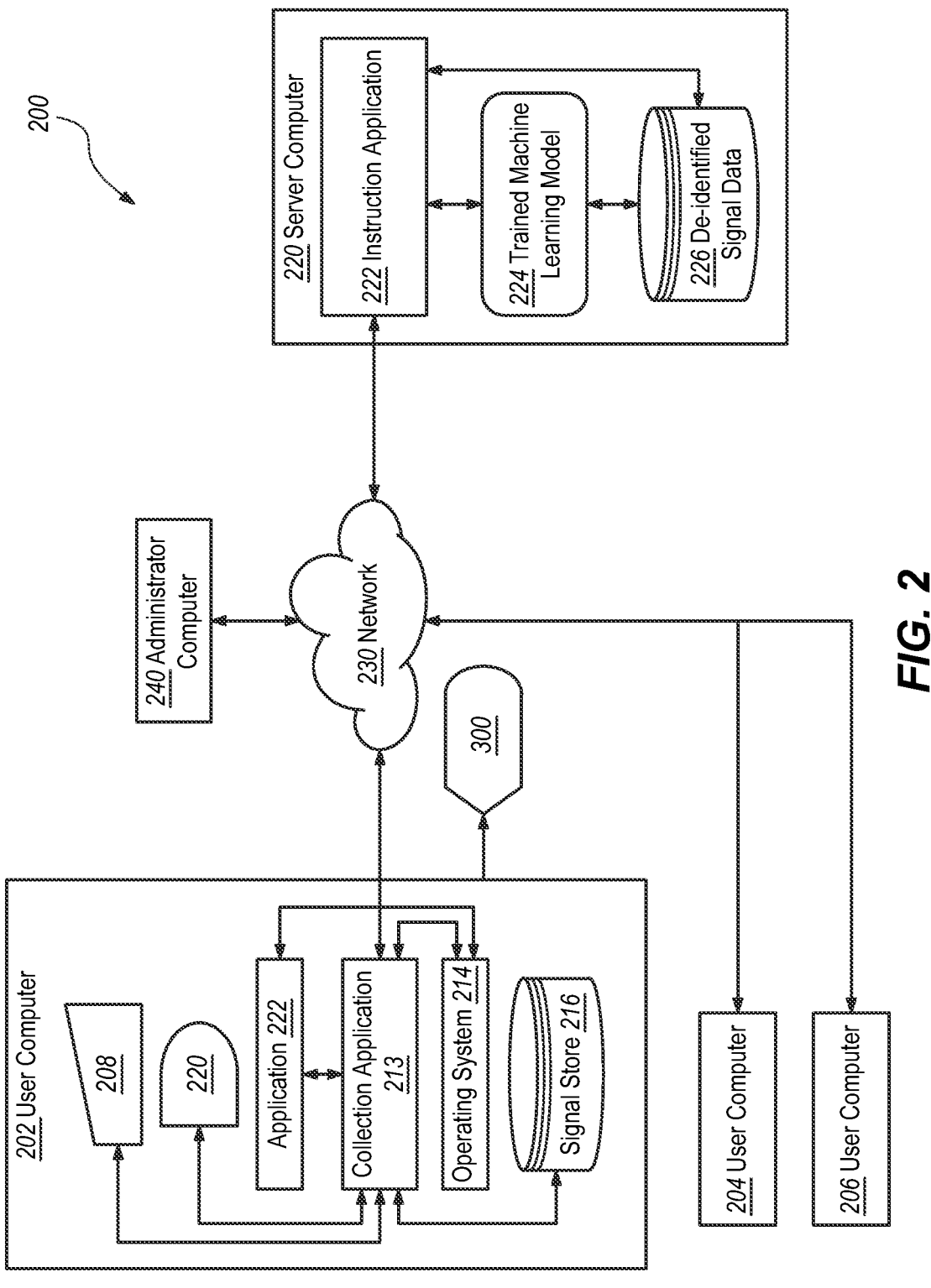
FIG. 2 illustrates a distributed computer system showing the context of use and principal functional elements with which one embodiment could be implemented.

FIG. 1 illustrates a distributed computer system showing the context of use and principal functional elements with which one embodiment could be implemented. FIG. 2 illustrates a distributed computer system showing the context of use and principal functional elements with which one embodiment could be implemented. Referring first to FIG. 1, in an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 and FIG. 2 each illustrate only one of many possible arrangements of components configured to execute the programming described herein. Other arrangements may include fewer or different components, and the division of work between the components may vary depending on the arrangement.

FIG. 1, FIG. 2, and the other drawing figures and all of the descriptions and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1, the distributed computer system 100 comprises a user computer 102 that is communicatively coupled via a data communication network to a server 104. User computer hosts or executes a passive listener component 106 and an on-device processing component 108, which can be implemented as application programs or extensions that the user computer 102 downloads and installs. As the user computer 102 operates, the passive listener component 106 subscribes to system service events of an operating system and listens to other programmed events and ports to detect signals based on instances of user interaction with other applications, software, hardware, or peripherals. Techniques for installing and using passive listener components for other purposes are described, for example, in application Ser. No. 17/525,727, filed Nov. 12, 2021, titled "Text Processing Using Transparent Windows," and application Ser. No. 17/525,740, filed Nov. 12, 2021, titled "Inferred Event Detection in Windowed Computer Applications," of the assignee hereof, the entire contents of which are hereby incorporated by reference for all purposes as if fully set forth herein.

Signals from passive listener 106 undergo on-device processing via an on-device processing component 108, resulting in creating and locally storing at the user computer 102 a file or database of de-identified signals 110. User computer 102 can also host or execute an individual contributor (IC) coaching component 112 that can receive signals from the on-device processing component 108 and respond with individualized coaching instruction, messages, notifications, or alerts that are presented in or over applications or services that the user computer is executing.

In an embodiment, on-device processing component 108 is programmed to transmit the de-identified signals 110 to server 104, where the de-identified signals are received at aggregation component 142. For purposes of illustrating a clear example, FIG. 1 shows a single user computer 102, but practical embodiments can involve dozens to millions of user computers 102, all transmitting or contributing different de-identified signals 110 to the aggregation component 142. The server 104 also can host or integrate third-party (3P) data 144, such as calendar data and/or human resources information systems (HRIS) data, from which other signals are received at the aggregation component 142. In some embodiments, some or all of the 3P data 144 can be collected from the user computer 102 via the on-device processing component 108.

Server 104 can also be programmed to host or execute an organization's health and attrition risk component 146, manager coaching component 148, and team dashboards 150, each of which can be implemented in the same or different software or programs. Each of the organization's health and attrition risk component 146, manager coaching component 148, and team dashboards 150 can be programmed to receive aggregated de-identified signals from the aggregation component 142 and generate one or more risk scores, performance scores, manager coaching recommendations, or visual displays that summarize or indicate insights derived from the de-identified signals 110.

In the example of FIG. 2, a plurality of user computers 202, 204, 206 are coupled communicatively through a network 230 to a server computer 220. For the purpose of illustrating a clear example, FIG. 2 shows three user computers, but practical embodiments can include thousands to millions of user computers based on the processing resources available for server computer 220. Each of the user computers 202, 204, 206 broadly represents any of a laptop computer, desktop computer, workstation, mobile computing device, smartphone, or other computing device useful to a knowledge worker, remote worker, hybrid worker, and/or remote employee of an enterprise.

Each user computer 202, 204, 206, as shown by the example for user computer 202, can comprise one or more input devices such as a keyboard 208 and mouse 210 or trackball, one or more productivity application programs 212, a collection application 213, an operating system 214, and a signal store 216. Each user computer 202, 204, 206 also can include other peripheral devices such as a camera, microphone, headphones, speakers, printer, softphone, plotter, scanner, and so forth. Each such peripheral, as well as the keyboard 208, mouse 210, application 212, and operating system 214 comprise sources of data signals that represent, demonstrate, indicate, or are associated with the use of the user computer 202 by the knowledge worker, remote worker, hybrid worker, and/or remote employee of an enterprise.

Application 212 can comprise any application program that is useful in knowledge work, remote work, or hybrid work. Examples include word processors, source code management systems, email clients, drawing programs, spreadsheets, and databases.

In some embodiments, the user computer 202 acquires the collection application 213 by downloading it from the server computer 220; the collection application also could be installed as part of a machine image or software image that is written onto the user computer by an enterprise that owns, manages, or controls the user computer, such as an enterprise or employer. In an embodiment, the collection application 213 is programmed to continuously collect data signals from any of the foregoing sources and to digitally store the data signals, or representations of the data signals, in a signal store 216.

Examples of data signals can include any one or more of the following: writing or other text that is input into application 212 or windows of websites that are shown in a browser; spoken language that is captured using a microphone and processed using speech analysis techniques in collection application 213 to derive attributes of tone or engagement; operating system events, application events, or other signals that are associated with scheduling an event in a calendar application; signals specifying a camera turning on or turning off; state data for the user computer 202 such as a sleep mode, power saver mode, or normal power on mode; task management data that the operating system 214 controls and that specify which application(s) 212 the user computer is then-currently executing; data from integrations of collection application to third-party systems such as human resources software. In an embodiment, the collection application 213 is programmed to passively collect any of the data signals specified herein without notification to the user computer 202 and without interrupting normal execution of the operating system 214, application 212, or other elements of the user computer.

In still other embodiments, input from user computer 102, 202 can be anything that is typed in any application and/or audio and video streams, collected using accessibility application programming interfaces (APIs) or any of the other techniques that are described, for example, in application Ser. No. 17/525,727, filed Nov. 12, 2021, titled "Text Processing Using Transparent Windows," and application Ser. No. 17/525,740, filed Nov. 12, 2021, titled "Inferred Event Detection in Windowed Computer Applications," of the assignee hereof. Examples include system clock values specifying a time of day at which a user computer 102, 202 is operating and/or at which someone is working, location data such as GPS coordinate values or other location data generated at mobile computing devices, notifications that the user computer 102, 202 receives, operating system settings concerning notifications or alerts, or the suppression thereof. Other examples include interactions with a calendar, instant messenger, or other applications that relate to professional productivity.

The collection application 213 can also be programmed to infer one or more data signals based on other data signals. For example, the collection application 213 can be programmed to infer, based upon activation, deactivation, and periods of use of a microphone, keyboard, or camera, and based upon comparison to calendar events in a calendar application, that the user of user computer 202 is in a meeting, conference, or otherwise engaged in work. One or more programmed rules of collection application 213 can result in creating and storing data signals that specify the date, time, and duration of a meeting or event rather than the raw signals from which the meeting or event was inferred.

Collection application 213 can also be programmed to passively monitor web traffic, such as the transmission of URLs from a browser of the user computer 202 over network 230. Data signals can represent website browsing or user activity, from which the collection application 213 can be programmed to infer whether the user computer 202 is engaged in work, distractions, or breaks. In some embodiments, collection application 213 can be programmed to transmit to the instruction application 222 of server computer 220 a request to categorize or classify a domain that appears in a URL transmitted from the browser. In response, server computer 220 can transmit a label, tag, or other value that specifies whether the domain appears to indicate work, distractions, or breaks. Based on the response, the collection application 213 can be programmed to output a key-value pair or other data signal for storage.

The collected data signals are stored in signal store 216, which can be organized as a relational database table, flat file, object store, or structured text document such as a JSON blob or YAML file. In various embodiments, signal store 216 stores collected data signals in a raw format, encoded format such as key-value pairs, or a de-identified format such as key-value pairs in which key values are obfuscated, encoded, encrypted, or otherwise transformed so that they cannot be associated with an end user of the user computer 202 and/or with personally identifiable information.

Collection application 213 can be programmed to periodically transmit the data signals from signal store 216 to instruction application 222. Or the instruction application 222 can be programmed to periodically poll the signal store 216 for new records or files that represent data signals. The instruction application 222 is programmed to store the data signals in database 226 as de-identified signal data.

Based on receiving data signals from collection application 213 or signal store 216, the instruction application 222 is programmed to select, generate, or determine one or more messages, notifications, information, or resources and to present the one or more messages, notifications, information, or resources to the end-user computer. For example, the de-identified signal data 226 can be evaluated using one or more trained machine learning models 224, which output one or more recommendations of messages, notifications, information, or resources with corresponding confidence values. In some embodiments, instruction application 222 can be programmed with algorithms to determine the recommendations rather than using the machine learning model 224. The instruction application 222 is programmed to select messages, notifications, information, or resources having corresponding confidence values that exceed a specified threshold confidence value. The threshold confidence value can be coded as part of the instruction application 222, stored in a configuration file, or received as input from an administrative computer 240 that is coupled to the server computer 220 directly or via network 230.

An embodiment can be programmed to provide recommendations of content based on the signal data. For example, if the instruction application 222 determines that the user is having difficulty focusing, it may recommend two videos, two articles, and a book. The instruction application 222 can also be programmed to collect user engagement data over time to improve the content that is recommended to users in different situations. For example, if selection or downloading data shows that users are engaging highly with "Video1" but not "Video2," then instruction application 222 can be programmed to prioritize Video1 and to hide Video2. Therefore, over time, engagement signals can improve the recommendation process and enable the implementation of collaborative filtering.

The messages, notifications, information, or resources can have any content from among a variety of different content. Examples include information about communication techniques or improved work techniques. For example, instruction application 222 might detect that the user computer 202 appears to be in use for an excessive number of work hours, as determined by a programmed or configured number of work hours that are associated with a healthy work-life balance. In response, the instruction application 222 could be programmed to deliver coaching content about how to manage working hours. Thus, the data signals can represent behavioral attributes of the user of the user computer 202 and may suggest problems for which the instruction application 222 can be programmed to generate and transmit suggestions that the user can implement or other actionable insights.

In some embodiments, instruction application 222 can be programmed to interact with user computers 202, 204, 206 as an assistant rather than providing messages, notifications, information, or resources. For example, instruction application 222 can be programmed to invoke services of operating system 214 to augment or supplement the operation of application 212 or other elements of user computer. For example, instruction application 222 can be programmed to implement augmented knowledge work with application 212, for example, by generating and causing displaying one or more layers of text, graphics, data, or other visualizations over the screen.

TABLE 1 shows example signals, measurement attributes, and algorithms for combining signals.

TABLE 1

SIGNAL-ALGORITHM EXAMPLES

| Signal Name | What it measures | Algorithm |
|---|---|---|
| | [Productivity] Focus Time | |
| | Time spent on deep work that requires flow and attention | Increment by 1 min for every 1 min window there is mouse/keyboard activity. Increment by 1 min when: 1) User is not in a meeting 2) There is keyboard/mouse activity 3) User is in a ≥1 hr block of time in which they have no meeting on their calander. Notes: We should take care to distinguish a "meeting" from a "block" on their calendar. Meetings are calender events that have at least 2+ attendees (user + someone else). Holds may have just the user or no attendees. We should also keep track of what apps/sites are being used during those focus times, as we'd want to surface them to the user and eventually give them the ability to classify app time as focus/not-focus. |
| | [Productivity] Meeting Time | |
| | Time spent in meetings interacting with one or more people. | Increment by 1 m for every 1 min window if the user's mic and camera are actively in use (not necessarily unmuted). |
| | [Wellness] Breaks | |
| | Discrete moments spent disconnecting from work in between the workday. | The number of distinct segments of time the user is AFK for at least 5 minutes. The counter resets if the user is back at their keyboard for at least 30 minutes. If the break lasts >1 hr then then time after an hour is considered "N/A" time. E.g. if the user goes AFK for 4 minutes and comes back-that isn't considered a break. E.g. if the user goes AFK for 10 minutes, comes back for a minute, then goes away for 20 more minutes, that's considered one break. |
| | [Connectedness] Conversations | |
| | Number of unique people you converse with in Slack. | For individual contacts Keep a list of individual people you talk to on Slack If you have a subsequent msg to the same person within a minutes, track that as a conversation which started with the first msg If a subsequent msg to the same person starts after 1 minute of the previous msg, track that as a new conversation |
| | Connectedness score- Base score-16 | connectedness multiplier. same team-1 for each manager you cross on the way up-multiplier +=1 for each additional person in the group/2 for group meetings, use max multiplier from all participants Text chat-1 Audio chat-2 Video chat-3 In-person-4 |

TABLE 2, shown in FIG. 6A, FIG. 6B, FIG. 6C, FIG. 6D, and FIG. 6E shows example signals, measurement attributes, and algorithms for combining signals.

2.2 Graphical Output Examples

Figure 3:
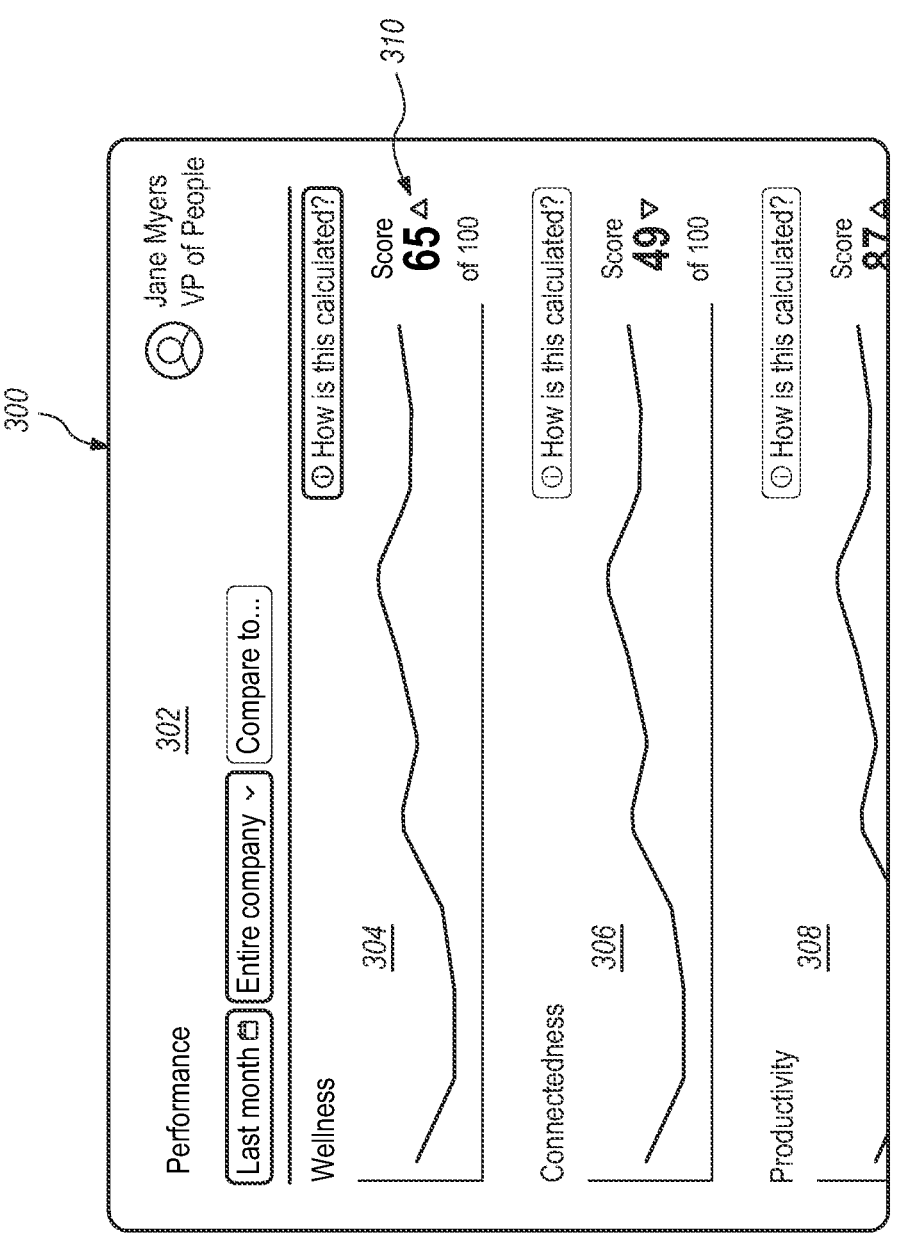
FIG. 3 illustrates an example graphical user interface providing analytical output.

FIG. 3 illustrates an example of an employee health dashboard. In the example of FIG. 3, a computer display device 300 of user computer 102, 202 has rendered and displayed a graphical user interface 302 comprising a plurality of performance attribute panels 304, 306, 308, each associated with a different performance attribute that has been derived from the signals. In one embodiment, instruction application 222 can be programmed to calculate a plurality of metrics based on the collected data signals and to generate and transmit presentation instructions to the administrator computer 240 that can be rendered and displayed using a browser in the format of FIG. 3. In some embodiments, example metrics include wellness, connectedness, productivity, attrition, and/or regrettable resignation rate, risk of resignation. Score value 310 can be calculated based on algorithmic combinations of the data signals that have been previously described. Displays like FIG. 3 can be used to make intangible feelings more quantifiable and actionable, can empower managers to advocate for their team by creating upward visibility, and the depersonalized and anonymous nature of data collection and reporting may be a positive thing for some employees who might not feel comfortable voicing concerns directly to their managers.

Figure 4:
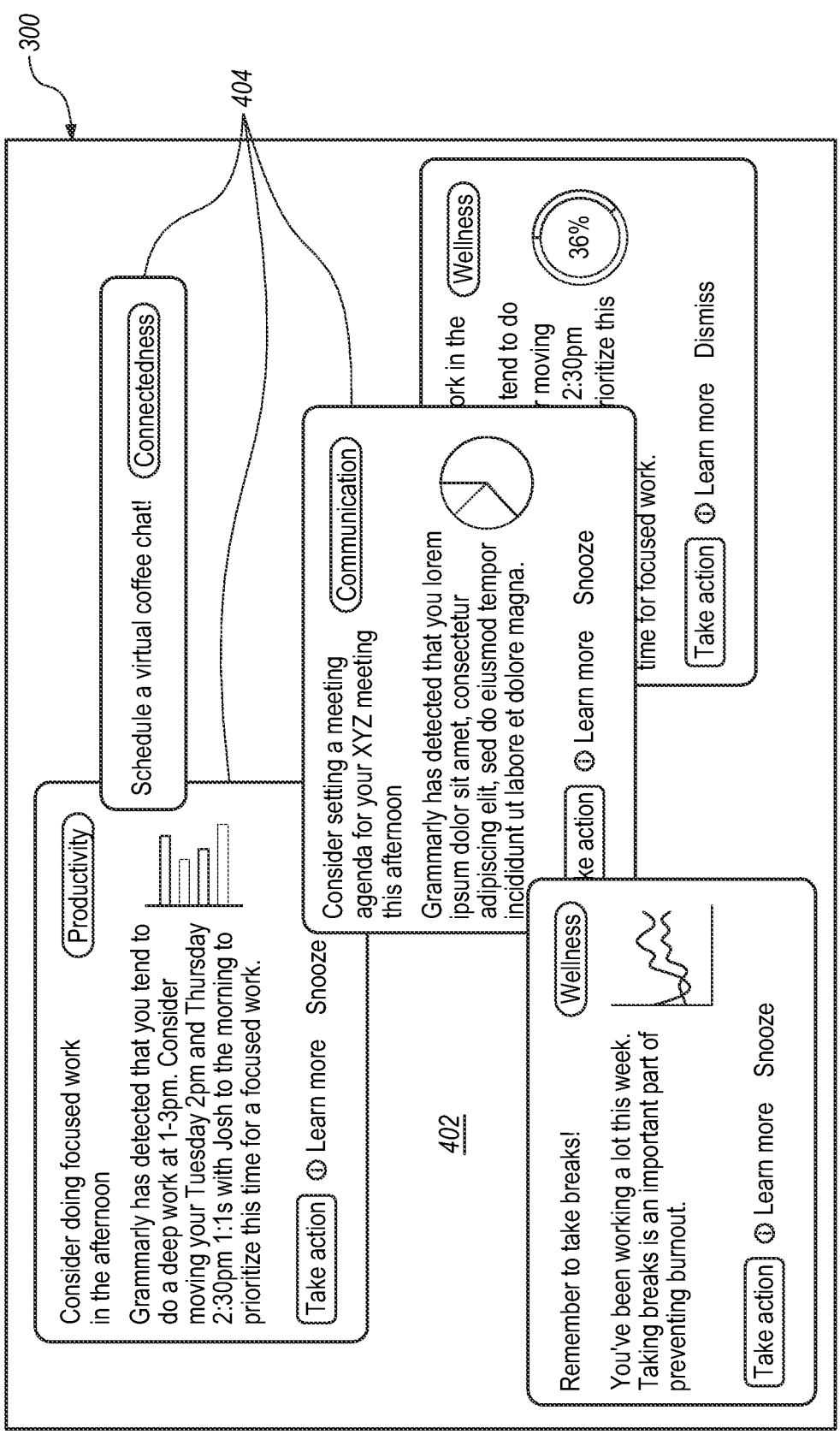
FIG. 4 illustrates an example graphical user interface providing instructional information.

FIG. 4 illustrates an example of how personalized coaching could be presented on the user's computer, independently or in conjunction with one or more applications. In the example of FIG. 4, the computer display device 300 of user computer 102, 202 has rendered and displayed a graphical user interface 402 comprising a plurality of coaching panels 404, each associated with a different message, notification, information, or resource that has been derived from the signals. IC coaching component 112 (FIG. 1) can be programmed to generate and cause rendering and displaying of coaching panels 404. FIG. 4 has the benefit of being empowering to employees, being tied to business metrics, possibly increasing retention if employees feel cared for, and taking some burdens off of management to conduct coaching or assistance.

Examples of substantive content for panel 404 can include: Reminding employees to take breaks; Using various software reminders/solutions (e.g., Outlook breaks, Apple watch); Flexibility and benefit options for employees (e.g., half-days to deal with life challenges, childcare support, mental health benefits); initiating or proposing 1:1 conversations; suggesting or automatically turning on Do Not Disturb features of an operating system or application of user computer 102, 202 to initiate focus time; generating or transmitting notifications or alerts to a manager or other related user based on the communication tone of the user of user computer 102, 202.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
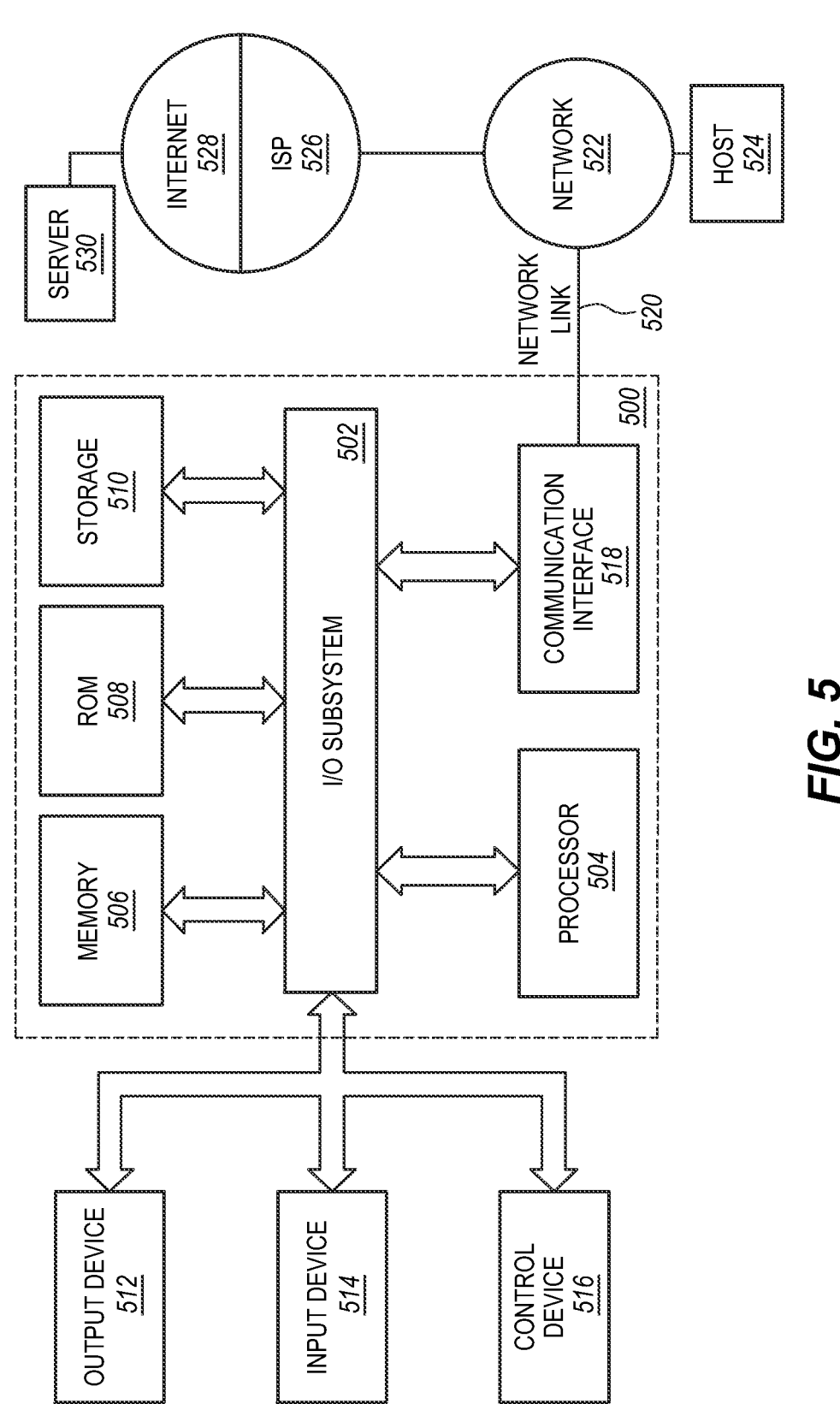
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software are represented schematically, for example, as boxes and circles, at the same level of detail that is commonly used by persons of ordinary skill in the art to which this disclosure pertains for communicating about computer architecture and computer systems implementations.

Computer system 500 includes an input/output (I/O) subsystem 502, which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, for example, as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system, a graphics processing unit (GPU), or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 may also be used for storing temporary variables or other intermediate information during the execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage devices coupled to I/O subsystem 502 for storing information and instructions for processor 504. The ROM 508 may include various forms of programmable ROM (PROM), such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disk such as CD-ROM or DVD-ROM and may be coupled to I/O subsystem 502 for storing information and instructions. Storage 510 is an example of a non-transitory computer-readable medium that may be used to store instructions and data, which, when executed by the processor 504, cause performing computer-implemented methods to execute the techniques herein.

The instructions in memory 506, ROM 508, or storage 510 may comprise one or more sets of instructions that are organized as modules, methods, objects, functions, routines, or calls. The instructions may be organized into one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer and data storage layer such as a relational database system using structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other type of control device. An input device 514 may include a combination of multiple different input devices, such as a video camera and a depth sensor.

In another embodiment, computer system 500 may comprise an Internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media.

For example, transmission media includes coaxial cables, copper wire and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal, and appropriate circuitry can provide the data to I/O subsystem 502, such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a worldwide packet data communication network represented as Internet 528. A server computer 530 may be coupled to Internet 528. Server 530 broadly represents any computer, data center, virtual machine, or virtual computing instance with or without a hypervisor or computer executing a containerized program system such as DOCKER or KUBERNETES. Server 530 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, a server farm, or other organizations of computers that cooperate to perform tasks or execute applications or services. Server 530 may comprise one or more sets of instructions that are organized as modules, methods, objects, functions, routines, or calls. The instructions may be organized into one or more computer programs, operating system services, or application programs, including mobile apps. The instructions may comprise an operating system and/or system software; one or more libraries to support multimedia, programming, or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer, and data storage layer such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server 530 might transmit a requested code for an application program through Internet 528, ISP 526, local network 522, and communication interface 518. The received code may be executed by processor 504 as it is received and/or stored in storage 510 or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. Inferred Detection of User Tasks, Goals, Tabs, and Documents Based on Time Series Data Representing Sequences of User Actions In one embodiment, the disclosure provides a computer-implemented local knowledge component (local knowledge engine (LKE)). A knowledge engine runs locally to identify what tabs or documents are pertinent to user work and use them to enhance writing suggestions without explicit user signaling. In one aspect, the disclosure provides application programming interfaces (APIs) that other applications can call to view, filter, or search previously collected data showing user actions and content in SaaS or desktop applications. With the APIs, the embodiments described in previous sections can be exposed via a data service that other applications can use. Data from desktop apps can use operating system accessibility APIs to detect user actions and focus. In another aspect, the LKE can create and store time series data representing sequences of user actions over time, allowing applications to infer user tasks or goals.

In some embodiments, the LKE may monitor, using extractor APIs, a plurality of streams of events or activities of user interactions with different applications or platforms of a computer (user computer or server computer or both). In an embodiment, the LKE is programmed to extract contents and contexts from the plurality of streams of events and activities using API extractors (extractor APIs), In an embodiment, the LKE is programmed to determine workflows associated with the user and associated content and context data. In an embodiment, the LKE is programmed to store the workflows with the contents and the contexts at the user computer. In an embodiment, the LKE is programmed to create one or more chunks of the workflows, each chunk being a subpart of a workflow. The chunks and subpart of the workflow may correspond to different timestamps. Each chunk includes contents and contexts of the workflows associated with different timestamps. In an embodiment, the LKE is programmed to evaluate the one or more chunks of the workflows to create inferred actions using the contents and contexts corresponding to the workflows associated with different timestamps. In this context, an inferred action is a user task or goal that can form the basis of writing suggestions or suggestions for invoking application features, functions, or actions. In an embodiment, the LKE is programmed to automate one or more subsequent workflows of the user according to the inferred actions to automatically manage the workflow productivity of the user. In some embodiments, LKE functions, steps, and operations may be performed at a user computer, a server computer, both a user computer and a server computer, or at a combination of the user computer and the server computer.

With the disclosed technology, computer software developers can write web-based applications that access the LKE, extract data from chat or messaging applications like Slack, extract data from online document storage applications like Google Drive, infer user workflows from the data, and modify the workflows or use the resulting content and context for application-specific purposes. Applications can add or retrieve specified documents to or from the LKE based on document IDs. Applications can add and retrieve activities to or from the LKE. Activities commonly power background apps like Google Drive and Slack. Activity retrieval can focus on a specific time window. Applications can add a new activity to the LKE to provide the LKE with information about which application(s) the user focused on over a specific time span. Activities can be retrieved based on a range of dates. Applications can add a new text document to the LKE or modify one to provide the LKE with information that an existing extractor didn't capture. Applications can retrieve documents in conjunction with search functions to retrieve information from the LKE to use in a web application. Applications can search documents in the LKE by title or author. Applications can find information chunks that match a query. Document snapshots at a specific date and time can be retrieved.

In various embodiments, aspects, and features, the disclosure encompasses the subject matter of the following numbered clauses:

Clause 1: A computer including one or more processors and instructions stored on one or more memory devices. The one or more processors executing the instructions to: monitor, using one or more extractor application programming interfaces (APIs), a plurality of streams associated with user's interactions with the computer, each of the plurality of streams including one or more events or activities associated with the user interactions, the user interactions being interactions with one or more different applications or platforms of the computer; extract contents and contexts from the plurality of streams using the one or more extractor APIs; determine one or more workflows associated with the user, the one or more workflows including the extracted contents and contexts, the workflows indicating the user's interactions with the computer during a time series comprising a plurality of timestamps associated with times at which the user performed the interactions with the computer; store the one or more the workflows at the user computer; determine one or more chunks of the one or more workflows, each chunk being a subpart of one of the one or more workflows and corresponding to a set of the plurality of timestamps associated with the subpart, each chunk including the content and contexts of the one or more workflows associated with the set of the plurality of timestamps; evaluate the one or more chunks, the evaluating creating one or more inferred actions using the content and contexts of the one or more workflows associated with the set of the plurality of timestamps; and automate one or more subsequent workflows associated with the user based on the one or more inferred actions.

Clause 2. The computer of clause 1, wherein the user interactions with the computer include user's engagement and attendance associated with calendar events, meetings, email conversations, reviewing, presentations, uniform resource locators (URL) links, conferences, video streams, studying materials, blogs, work applications, non-work applications, active interactions, inactive interactions, or application programs.

Clause 3. The computer of clause 1, wherein the one or more extractor APIs comprise one or more Ally-tree-based extractors, OAuth-based extractors, and extractors based on optical character recognition (OCR), or extractors based on automatic speech recognition (ADR).

Clause 4. The computer of clause 1, the one or more processors executing the instructions to: receive one or more queries specifying a particular chunk; retrieve content and context associated with the particular chunk; and evaluate the particular chunk using the retrieved content and context associated with the particular chunk, the evaluating creating one or more inferred actions associated with the particular chunk.

Clause 5. The computer of clause 1, the one or more processors executing the instructions to determine an order by which the inferred actions are displayed on a display device of the computer.

Clause 6. The computer of clause 1, the one or more processors executing the instructions to display suggestive items on a display device of the computer according to the determined order.

Clause 7. The computer of clause 1, wherein the one or more inferred actions include a coaching instruction of message.

Clause 8. The computer of clause 1, wherein the automating of the one or more subsequent workflows includes automatically triggering one or more applications coupled over accessibility APIs based on the one or more inferred actions.

Clause 9. The computer of clause 1, the one or more processors executing the instructions to predict one or more new workflows based the one or more of the inferred actions.

Clause 10. The computer of clause 1, wherein the automating of the one or more subsequent workflows associated with the user based on the one or more inferred actions includes automatic management of the one or more subsequent workflows such that an application of the one or more subsequent workflows interacted with by the user provides functionality in accordance with the one or more inferred actions.

Clause 11. A computer-implemented method comprising: monitoring, by a computer including one or more processors and instructions stored on one or more memory devices, using one or more extractor application programming interfaces (APIs), a plurality of streams associated with user interactions with the computer, each of the plurality of streams including one or more events or activities associated with the user interactions, the user interactions being interactions with one or more different applications or platforms of the computer; extracting contents and contexts from the plurality of streams using the one or more extractor APIs; determining one or more workflows associated with the user, the one or more workflows including the extracted contents and contexts, the workflows indicating the user's interactions with the computer during a time series comprising a plurality of timestamps associated with times at which the user performed the interactions with the computer; storing the one or more the workflows at the user computer; determining one or more chunks of the one or more workflows, each chunk being a subpart of one of the one or more workflows and corresponding to a set of the plurality of timestamps associated with the subpart, each chunk including the content and contexts of the one or more workflows associated with the set of the plurality of timestamps; evaluating the one or more chunks, the evaluating creating one or more inferred actions using the content and contexts of the one or more workflows associated with the set of the plurality of timestamps; and automating one or more subsequent workflows associated with the user based on the one or more inferred actions.

Clause 12. The computer-implemented method of claim 11, wherein the user interactions with the computer include user's engagement and attendance associated with calendar events, meetings, email conversations, reviewing, presentations, uniform resource locators (URL) links, conferences, video streams, studying materials, blogs, work applications, non-work applications, active interactions, inactive interactions, or application programs.

Clause 13. The computer-implemented method of claim 11, wherein the one or more extractor APIs comprise one or more Ally-tree-based extractors, OAuth-based extractors, and extractors based on optical character recognition (OCR), or extractors based on automatic speech recognition (ADR).

Clause 14. The computer-implemented method of claim 11, further comprising: receiving one or more queries specifying a particular chunk; retrieving content and context associated with the particular chunk; and evaluating the particular chunk using the retrieved content and context associated with the particular chunk, the evaluating creating one or more inferred actions associated with the particular chunk.

Clause 15. The computer-implemented method of claim 11, further comprising: determining an order by which the inferred actions are displayed on a display device of the computer.

Clause 16. The computer-implemented method of claim 11, further comprising: displaying suggestive items on a display device of the computer according to the determined order.

Clause 17. The computer-implemented method of claim 11, wherein the one or more inferred actions include a coaching instruction of message.

Clause 18. The computer-implemented method of claim 11, wherein the automating of the one or more subsequent workflows includes automatically triggering one or more applications coupled over accessibility APIs based on the one or more inferred actions.

Clause 19. The computer-implemented method of claim 11, further comprising: predicting one or more new workflows based the one or more of the inferred actions.

Clause 20. The computer-implemented method of claim 11, wherein the automating of the one or more subsequent workflows associated with the user based on the one or more inferred actions includes automatic management of the one or more subsequent workflows such that an application of the one or more subsequent workflows interacted with by the user provides functionality in accordance with the one or more inferred actions.

In an embodiment, and the disclosure encompasses a non-transitory computer-readable medium storing instructions which, when executed by a processor, causes the processor to perform the functions of the methods that are described herein.

In some embodiments, the LKE may be configured to extract content and context data, from applications that the user is interacting with on their computer and to store the content and context data locally on the computer or at a remote location, such as a remote server. The content and context data may enable inferring or determining the user's actions. In an embodiment, the LKE is programmed to extract content and context data from applications the user interacts with or from user interactions, and store the content and context data in the user computer(s) 202, 204, and 206, administrator computer 240, and/or server computer 220, for example. In some embodiment, content and context data may include user contextual information, such as computer type, location, language, application of focus, date, and time. In some embodiments, content and context data stored locally can be exported to the server computer 220 as needed.

The content and context data of the user interactions may be extracted from different interactive platforms, messaging platforms and conversation/conference interactions. The extracted content and context data may assist in determining and composing additional context about the user's actions. The LKE may be configured to determine, extract, and analyze essential parts of the user's workflow along with the context of the user's current task and where the current task lies in the user's workflow. From the user's workflow and context of the user's current task, the LKE can be programmed to generate and present suggestions or recommendations associated with the user's actions, or prompts relevant to the user's current context. The suggestions or recommendations may be enriched with relevant contextual information by the LKE.

In some embodiments, the LKE may call the functions of an accessibility API of an operating system and can implement programmatic methods that other applications can call using JavaScript (JS) APIs. For example, an LKE can be programmed to serve features to other applications executing on MacOS, Windows, or using a browser extension, using a single API. The LKE API can abstract the accessibility API functions of an underlying operating system, so applications work the same way across any of the platforms. For example, the single API allows building common business logic in JS to be consistent across platforms. Web applications of many kinds can call the LKE APIs to obtain the content and context data and/or the inferred actions.

Example LKE Computing Architecture

FIG. 7 shows an example software architecture of one embodiment of an LKE. In the example of FIG. 7, architecture 700 represents a combination of sets of stored program instructions representing a plurality of different components of an LKE operating environment. Rectangles in architecture 700 represent different functional elements, and positions of rectangles in the architecture indicate programmatic interfaces between elements that permit instructions and data to flow between the elements.

The architecture 700 includes application access instructions 702, which are programmed for identifying and determining contexts that may exist where code is executed, applications and/or modules operate. For example, application access instructions 702 can be programmed to programmatically call accessibility APIs of MacOS or Windows operating systems to determine the window that has user focus at a particular time, the application using that window, the text contents of the window, and the then-current position of a cursor. Similarly, application access instructions 712 can be programmed to programmatically call native operating system functions implemented in Swift or C++.

In an embodiment, architecture 700 further includes Webview 704 and JS Sandbox 710, which represent environments for running and executing applications and/or modules. Webview 704 and JS Sandbox 710 may both be JS environments for apps and/or modules to run. Applications running within the architecture 700 may have components in the Webview 704 and/or the JS Sandbox 710.

The architecture 700 includes LKE JS APIs 706 and OS JS interface 708 that act as common communication protocols. For example, LKE JS APIs 706 and OS JS interface

708 may exist between three contexts (application access instructions native swift/C #712, Webview 704, and JS Sandbox 710) so that any context can exchange messages with the other two. For example, LKE JS APIs 706 may be available in both JS environments Webview 704 and JS Sandbox 710. In some embodiments, LKE JS APIs 706 includes a plurality of content extractors that may be built on top of OS JS interface 708 (which includes OS APIs). The LKE JS APIs 706 may leverage the architecture 700 of running JS code in the background JS Sandbox 710.

The architecture 700 further includes storage 714 which comprises document storage 716, activity storage 718 and search space 720. In some embodiments, LKE JS APIs 706 may include APIs for other apps/applications running on OS to retrieve the stored content, context, user interactions, texts from user interactions, description of images shared during the interactions, and the like from the storage 714.

The architecture 700 further includes a Ally tree 722 that may be traversed by content extractors, for example Ally-tree-based extractors to extract contents. In this context, the shorthand "Ally" is an abbreviation for "accessibility." For example, Ally-tree-based extractors may traverse Ally tree 722 to extract interactions, documents, messages, and the like, and store them in the storage 714. In Windows systems, a document object model or DOM tree of a web page contains objects representing all elements, attributes, and text nodes of a page expressed in a markup language; browsers then create an accessibility tree in memory that exposes a semantic version of the page user interface to assistive technology via an API.

The architecture 700 includes other native capabilities 724 to optimize message exchanges synchronously and/or by directly mapping native objects into the JS Sandbox 710 and/or Webview 704.

Message Flow

In some embodiments, a message-passing mechanism for communication between the three contexts of Webview 704, JS Sandbox 710, and Native code 712 may be provided. In some embodiments, all the message exchanges may be asynchronous by default. In some embodiments, the message exchanges may be optimized on a case-by-case basis by either making them synchronous or, in the case of the JS Sandbox 710, directly mapping native objects into the JS Sandbox 710. The specific message exchange is not critical provided that the aforementioned elements have a programmatic means of transmitting and receiving data.

Storage

In some embodiments, architecture 700 may provide storage APIs 714 in both JS contexts for storage and retrieval of user interactions, activities, actions, events, stream of events, content, and context. In some embodiments, LKE JS APIs 706 may leverage APIs 714 to store the extracted content, context, stream of events, activities, actions, and user interactions in a consistent schema so that any feature (e.g., 722, 724, 710, and 704) may search and retrieve relevant content and data.

Security

In some embodiments, architecture 700 may include security measures that protect stored data that is stored by storage APIs 714. In some embodiments, stored data may be encrypted and/or decrypted and may be indexed such that searching the stored data may be performed using the indexing. The encrypting may be dependent on a threat vector and/or privacy and/or security requirements. In some embodiments, downloading and executing JS code may similarly have security mechanisms in place.

LKE Content Extractors

In some embodiments, LKE JS APIs 706 may include various LKE content extractors. Content extractors are the mechanism that feeds data into the LKE. For example, content extractors may extract content, description, text, context, and data from applications and websites that a user interacts with and create structured data objects out of the extracted content. For example, content extractors may be Ally-based extractors and/or OAuth token-based extractors. For example, content extractors may be Optical Character Recognition (OCR)-based extractors and/or Automatic Speech Recognition (ASR)-based extractors. In some embodiments, the content extractors may be written in JS and run in the background JS Sandbox 710 so that the same extractor can run regardless of the operating system. In some embodiments, extractors running on the extension may be the same or different.

Ally-tree-based extractors: On Mac and Windows, gOS may expose the ally tree from each platform as a consistent JS object so that the same extractor code may work on both platforms, Sandbox 710 and Windows 702. The extractors may traverse the ally tree and extract the content of, for example, interactions, documents, messages, and the like and store them in the LKE. Extractors can be written for various apps and websites to extract and store content in the LKE. For example, for Slack, the extractor may traverse the tree and extract the content of messages from different channels and direct messages (DMs) and store them in the LKE.

Oauth-based extractors: In some embodiments, Oauth-based extractors may be used. For example, for apps and websites that don't provide an ally tree at all (or do not provide a reliable ally tree) to extract content, other means like API-based connectors may be used and request the content that the user is interacting with through back-end APIs. For example, Oauth-based extractors may be used. For example, for Google Docs, an OAuth-based extractor may be used because Google Docs may not provide an ally tree for the text content in the document.

LKE JS APIs

In some embodiments, LKE JS APIs may be used to extract data and content, including context. In some embodiments, the LKE JS APIs include one or more of Document APIs and Activity APIs. For example, Document APIs may be used to extract user data and content from documents that a user is accessing and/or creating. For example, Activity APIs may be used to determine activity of a user—for example, which applications a user is accessing, how a user is accessing and interacting with such applications, which content a user is accessing, and how a user is accessing and interacting with such content. The information extracted via the Document and/or Activity APIs may be used by the LKE to influence its generation of suggestions and/or directives for a user.

In some embodiments, Document APIs allow the storage and retrieval of structured content that a user views, e.g., in a document or in a messaging application, for example. For example, both Slack and Google Docs are the two sources of content and store a Document object. The following provides an overview of Document APIs that may be used in embodiments of this disclosure.

addDocument API

The addDocument API may be used to add a new text document to the Local KE database and/or modify an existing document. In doing so, the addDocument functionality may provide the local knowledge engine (KE) with information that may not have been captured by an existing extractor. An example is shown below.

```
Signature
addDocument(doc: Document): Promise<void>
Usage
-await platform.ke.addDocument({
    id: 'test-${new Date( ).getUTCMilliseconds( )}`,
    title: 'test',
    body: 'test',
    source: 'Demo App,'
    language: 'ENGLISH',
    created: new Date( ).getUTCMilliseconds( ),
    modified: null,
    chunks: [ ],
    contentType: 'PLAIN',
    author: 'charles',
})
```

The addDocument API may also use the following syntax to store documents in the LKE using platform.kc.addDocument.

```
export default function App({ name }: Props) {
    const [title, setTitle] = React.useState("");
    const [content, setContent] = React.useState("");
    const [author, setAuthor] = React.useState("");
    const [document, setDocument] = React.useState([ ]);
    return (
        <section>
            <h2>Add a document</h2>
            <div>
                <Input
                    id="title"
                    label="Title"
                    onChange={(e) => setTitle(e.target.value)}
                />
                <Textarea
                    id="textarea"
                    label="Textarea"
                    onChange={(e) => setContent(e.target.value)}
                />
                <Input
                    id="author"
                    label="Author"
                    onChange={(e) => setAuthor(e.target.value)}
                />
                <button
                    onClick={async ( ) => {
                        const id = '${Math.floor(Math.random( ) * 999999 + 1)}';
                        // Add a document to the Local KE database
                        await platform.ke.addDocument({
                            id,
                            title,
                            body: content,
                            source: "my-app",
                            author,
                            chunks: [ ],
                        });
``` getDocument API

The getDocument API may be used to documents by document ID or may be null if none exists. The function may be used in conjunction with document search functions (e.g., searchDocuments and searchDoumentsByTitle) to search and retrieve documents based on title, author, and/or search terms. The function may be used with such search functions to retrieve information from the local KE for other uses. An example is shown below.

```
Signature
getDocument(id: string): Promise<Document | null>
Usage
-const document = await platform.ke.getDocument(d.id)
-Returns
{
    "chunks": [ ],
    "id": "https://grammarly.slack.com/archives/1234/pabcdefg56789,
    "contentType": "UNKNOWN",
    "title": "local-ke-team (channel)",
    "language": "UNKNOWN",
    "created": 1689006707000,
    "modified": 0,
    "body": "This is an example body from the Slack extractor."
}
```

The getDocument API may also use the following syntax to retrieve documents using document id using platform.ke.getDocument.

```
// Retrieve your newly created document
        const newDoc = await platform.ke.getDocument(id);
        setDocument(newDoc);
    }}
>
    Submit
</button>
</div>
// Render the document to the page
<pre>{JSON.stringify(document, null, 2)}</pre>
</section>
);
}
``` searchDocumentsByTitle API

The searchDocumentsByTitle API may be used to search for and find documents matching a given query by title. An example is shown below.

```
Signature
searchDocumentsByTitle(title: string): Promise<Array<DocumentMeta>>
Usage
-const query = 'local-ke-team'
// An empty string is the equivalent of matching everything (i.e., "select *")
const documentMetas = await platform.ke.searchDocumentsByTitle("")
-Returns
[
    {
        "language": "UNKNOWN",
        "id": "https://grammarly.slack.com/archives/CO4444444/p1687301850634049",
        "title": "public-slack-channel (channel, has draft)",
        "created": 1689029850000,
        "contentType": "UNKNOWN"
    },
    {
```

-continued

```
    "language": "UNKNOWN",
    "id": "https://grammarly.slack.com/archives/CO5555555/p12345abcdefg",
    "title": "private-slack-channel (private channel)",
    "created": 1689032351000,
    "contentType": "UNKNOWN"
  },
]
``` searchDocumentsByAuthor API

The searchDocumentsByAuthor API may be used to find documents matching the given query. An example is shown below.

```
Signature
-async searchDocumentsByAuthor(author: string):
Promise<Array<Document>>
-Usage
// An empty string is the equivalent of match everything (i.e., "select *")
const documents = await platform.ke.searchDocumentsByAuthor(query)
Returns
[
  {
    "chunks": [ ],
    "id": "https://grammarly.slack.com/archives/1234/pabcdefg56789",
    "contentType": "UNKNOWN",
    "title": "local-ke-team (channel)",
    "language": "UNKNOWN",
    "created": 1689006707000,
    "modified": 0,
    "author": "Arthur",
    "body": "This is an example body from the Slack extractor."
  }
]
``` searchChunks API

The searchChunks API may be used to find chunks matching a given query. For example, a search type may be controlled using a searchType parameter within optional Search Options. For example, searchType values may include "FULLTEXT" and "SIMILARITY." For example, when searching an underlying vector database "SIMILARITY" may be used as a searchTYPE. An example of using the searchChunks API is shown below.

```
Signature
-async searchChunks(query: string, option: SearchOptions | null):
Promise<Array<Chunk>>
-Usage
const documents = await platform.ke.searchChunks(query, {limit: 10,
searchType: "SIMILARITY"})
```

Other Document APIs include getDocumentSnapshot and getDocumentHistory.

getDocumentSnapshot may be used to retrieve a snapshot of a document at a specific date and time. An example is shown below.

getDocumentSnapshot

Signature getDocumentSnapshot(id: string, targetDateTime: number): Promise<DocumentSnapshot|null>

Usage

-const snapshot=await platform.ke.getDocumentSnapshot (docId, timestamp)

```
-Returns
{
  "source": "gdrive",
  "author": "Charles Watkins",
  "id": "1iIqzxgMioaNU3a5CjgSUOxjG7YJgyQaoZS7nNN__O6vk",
  "contentType": "UNKNOWN",
  "title": "A Google Drive Document",
  "language": "UNKNOWN",
  "created": 1683243060877,
  "modified": 1690239229591,
  "body": "This is an example body from the Google Drive extractor."
}
``` getDocumentHistory may be used to retrieve history associated with a document. An example is shown below.
getDocumentHistory
Signature
getDocumentHistory(id: string, startDateTime: number, endDateTime: number):
Promise<Array<DocumentSnapshot>>
Usage
-const documentHistory=await platform.ke.getDocumentHistory(docId, startDateTime: start, endDateTime: end)

```
-Returns
[
  {
    "source": "gdrive",
    "author": "Charles Watkins",
    "id": "1iIqzxgMioaNU3a5CjgSUOxjG7YJgyQaoZS7nNN__O6vk",
    "contentType": "UNKNOWN",
    "title": "A Google Drive Document",
    "language": "UNKNOWN",
    "created": 1683243060877,
    "modified": 1690239229591,
    "body": "This is an example body from the Google Drive extractor."
  },
  {
    "source": "gdrive",
    "author": "Charles Watkins",
    "id": "1iIqzxgMioaNU3a5CjgSUOxjG7YJgyQaoZS7nNN__O6vk",
    "contentType": "UNKNOWN",
    "title": "A Google Drive Document",
    "language": "UNKNOWN",
    "created": 1683243060877,
    "modified": 1690239229591,
    "body": "This is an example body from the Google Drive extractor
    that has been edited."
  },
]
```

Activity APIs

In some embodiments, Activity APIs are programmed to extract user actions such as clicks, presses, scrolling, etc., in relation to applications and/or documents. In some embodiments, the Activity APIs allow background JS Applets to register triggers for such user actions (e.g., clicks, keypresses, scrolling, etc.). For example, the applets can track and store (e.g., using storage APIs discussed previously) these user actions. Applications may then analyze user actions to predict which action the user might take next or to learn particular user workflows.

In some embodiments, activities may be added to the LKE. For example, the function platform.ke.addActivity may be used. Activities may be used by extractors in relation to a user's interactions with Google Drive and Slack, for example. APIs may be available through the user interface of the system 700, however. The following syntax may be used by Activity APIs to add activities to the LKE.

```
// background/index.ts
// Add activities in the background
export function activate( ) {
    console.log("Hello, world!");
    platform.addEventListener("app_focus", appFocusListener);
}
export function deactivate(state: ReturnType<typeof activate>) {
    platform.removeEventListener("app_focus", appFocusListener);
    console.log("Bye, world!");
}
async function appFocusListener(e: AppEvent) {
    // Add an activity whenever the user changes application focus
    platform.ke.addActivity({
        activityType: "FOCUS_CHANGED",
        createdDateTime: new Date( ).getUTCMilliseconds( ),
        application: e.detail.name,
    });
}
```

In some embodiments, activities can be retrieved from a specific time window. For example, the function platform.ke.getActivities may be used.

```
// ui/App.tsx
// Render our activities to our UI and bucket the samples into a single day
import React from "react";
export default function App( ) {
    const [activities, setActivities] = React.useState([ ]);
    const now = new Date( );
    React.useEffect(( ) => {
        const getActivities = async ( ) => {
            console.log("getting activities until now: ", now.getTime( ));
            try {
                const a = await platform.ke.getActivities(0, now.getTime( ), {
                    amount: 1,
                    aggregation: false,
                    unit: "DAY",
                });
                setActivities(a);
            } catch (error) {
                console.log(error);
            }
        };
        getActivities( );
    }, [ ]);
    return (
        <div>
            Hello, world!
            <pre>{JSON.stringify(activities, null, 2)}</pre>
        </div>
    );
}
```

The following syntax may also be used using getActivities.

getActivities

Signature getActivities(start Date Time: number, endDate Time: number|null, bucketOption:

BucketOption|null): Promise<Array<Bucket>>

Usage

-platform.ke.get Activities(startTime, endTime)

```
Returns
[
    {
        "samples": [
            {
                "application": "Google Chrome",
                "createdDateTime": 104,
                "activityType": "FOCUS_CHANGED",
                "repeat": 1
            },
            {
                "application": "Safari",
                "createdDateTime": 336,
                "activityType": "FOCUS_CHANGED",
                "repeat": 1
            },
            {
                "application": "Slack",
                "createdDateTime": 644,
                "activityType": "FOCUS_CHANGED,"
                "repeat": 1
            },
        ],
        "startDateTime": 0,
        "endDateTime": 86400000
    }
]
```

Here, activities are retrieved from the local KE database. In some embodiments, if endDateTime is null, then endDateTime is set to the current time. In some embodiments, if bucketOption is null, all activities will be returned in a single bucket.

Information about documents and activities captured by the LKE may be categorized in numerous ways, and interfaces may be provided that allow for such categorizing. In some embodiments, an activity (click, keypress, etc.) that has been captured by the LKE may be categorized by activity type. The ActivityType function, for example, may provide for such categorization as follows using an Activity interface:

| Activity |
| --- |
| export interface Activity { <br> createdDateTime: number; <br> activityType: ActivityType \| '${ActivityType}'; <br> application: string; <br> documentId?: string \| null; <br> } |

In some embodiments, activities may be bucketed according to a specific time interval. For example, a BucketOption function and interface can be used for bucketing activities by a specific time interval. An example is shown below.

| BucketOption |
| --- |
| export interface BucketOption { <br> amount: number; <br> unit: BucketTimeUnit \| '${BucketTimeUnit}'; <br> aggregation: boolean; <br> } |

In some embodiments, a text document and metadata may be analyzed and used by the LKE. For example, a Document function can be used. An example is shown below.

```
                        Document export interface Document {
    id: string;
    title?: string | null;
    body: string;
    language?: Language | '${Language}' | null;
    contentType?: ContentType | '${ContentType}' | null;
    modified?: number | null;
    created?: number | null;
    source: string;
    author?: string | null;
    chunks: Array<Chunk>;
  }
```

In some embodiments, metadata about a document, such as, for example, its title, language, type, and when it was created may be analyzed and used by the LKE. For example, a DocumentMeta function can be used. An example is shown below.

```
                     DocumentMeta export interface DocumentMeta {
    id: string;
    title?: string | null;
    language?: Language | '${Language}' | null;
    contentType?: ContentType | '${ContentType}' | null;
    modified?: number | null;
    created?: number | null;
    source: string;
  }
```

In some embodiments, a snapshot of a document at a particular time may be analyzed and used by the LKE. For example, a DocumentSnapshot function can be used. An example is shown below.

```
                   DocumentSnapshot export interface DocumentSnapshot {
    id: string;
    title?: string | null;
    body: string;
    language?: Language | '${Language}' | null;
    contentType?: ContentType | '${ContentType}' | null;
    modified?: number | null;
    created?: number | null;
    source: string;
    author?: string | null;
  }
```

Figure 8:
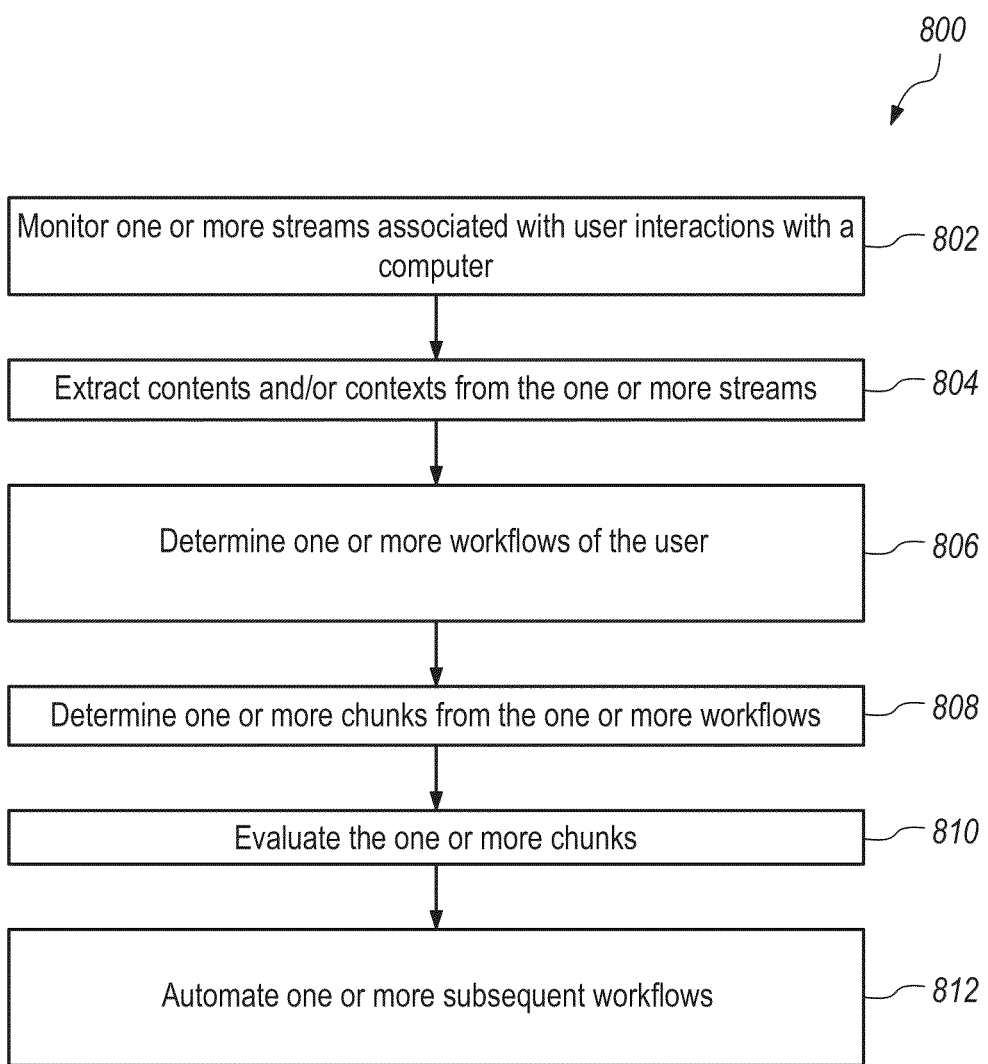
FIG. 8 illustrates a flow diagram of a computer-implemented process or algorithm of a local knowledge engine (LKE) according to some embodiments.

FIG. 8 illustrates a flow diagram of a computer-implemented process or algorithm 800 of a local knowledge engine (LKE) according to some embodiments. In some embodiments, process 800 is executed by the LKE 706 that is programmed to extract contents and/or contexts of the user computer 202, 204 and 206. The components of user computers 202, 204, and 206 discussed herein (e.g., with respect to FIG. 2) may interact with LKE 706 to obtain and provide recommendations associated with a user. For example, the contents and/or contexts may be utilized to determine workflow(s), automate workflow(s), and/or manage workflow(s) of the user. In some embodiments, the contents and/or contexts may be utilized to provide suggestions or recommendations to a user regarding their workflow(s).

Step 802 is programmed to monitor one or more streams associated with user interactions with a computer. For example, one or more streams of one or more events and/or activities associated with the user interactions are monitored. For example, the monitoring may be of a user's events and/or activities in relation to a user's use and interactions with one or more different applications and/or platforms executed within architecture 700. In some embodiments, passive listener 106 and/or collection application 213 may be used to monitor the one or more events and/or one or more activities of the user as discussed herein utilizing LKE 706. For example, LKE 706 may use one or more extractor APIs to execute monitoring at step 802, and may pass monitored information to passive listener 106 and/or collection application 213. The monitoring and/or one or more streams may be timestamped, such that the user's events and/or activities are tracked over a certain period.

In some embodiments, the one or more streams of events and/or activities of a user, or the events and/or activities themselves, include user engagement and attendance (e.g., via user activities and interactions with a user computer) associated with any one or a combination of the following: calendar events, meetings, email conversations, reviewing content, presentations, uniform resource locators (URL) links, conferences, video streams, studying materials, blogs, work applications, non-work applications, active interactions, inactive interactions, application programs, and a combination thereof. For example, the different applications and platforms include any one or more of web platforms, applications, documents, images, messages, presentations, emails, attachments, files, web pages, interactive platforms, interaction channels, conversations, conferences, web applications, and a combination thereof.

At step 804, contents and/or contexts from the one or more streams associated with user interactions with a computer are extracted. For example, contents and/or contexts from the one or more streams of one or more events and/or activities of the user are extracted. In some embodiments, LKE 706 may include one or more extractor APIs that monitor the one or more streams of the user and to extract the contents and/or contexts. For example, the one or more extractor APIs may include Ally-tree-based extractors, OAuth-based extractors, extractors based on optical character recognition (OCR), and/or extractors based on automatic speech recognition (ADR). For example, the Document and/or Activity APIs discussed herein may be used as the one or more extractors. In some embodiments, instruction application 222 may receive the contents and/or contexts extracted by LKE 706 and instruction application 222 may perform its functionality as already described herein in relation to such contents and/or contexts that are extracted by LKE 706 and received.

At step 806, one or more workflows of the user are determined. In some embodiments, the one or more workflows correspond to one or more timestamps associated with a user's events and/or activities, and each workflow may occur over a time period represented by a time series of the time stamps. For example, the one or more workflows may indicate the user's interactions with the computer during a time series comprising a plurality of timestamps associated with the times at which the user performed the interactions with the computer. For example, the one or more workflows may indicate the user's events and/or activities during a time series comprising a plurality of timestamps associated with times at which the events and/or activities occurred. In some embodiments, each of the one or more workflows is associated with a user's activities and/or interactions with one or more applications and/or platforms that are determined from the monitoring one or more streams of one or more events and/or activities of the user. In some embodiments, the one or more workflows include some or all of the extracted contents and/or contexts. The one or more workflows may be stored locally at the user's computer, stored at a server, stored at both the user's computer and the server, and/or stored in a combination of the user's computer and the server.

At step 808, one or more chunks of the one or more workflows are determined. In some embodiments, a chunk is a subpart of a workflow of the one or more workflows. In some embodiments, a chunk is the entirety of a workflow of the one or more workflows. In some embodiments, the one or more chunks are determined based on the one or more timestamps and therefore may be, for example, based on timestamps representing the subpart of a workflow or the entirety of a workflow. In some embodiments, the one or more workflows are digitized, and the one or more chunks are determined from the digitized one or more workflows. In some embodiments, one or more sequences of workflows may be created. For example, a sequence may include one or more chunks of workflows of a user, where each chunk corresponds to a different set of time stamps (i.e., a different time series of time stamps). In some embodiments, one or more threads of a chunk are determined. For example, a thread may be a subpart of a chunk, reflecting part of the workflow that is in the subpart of the chunk. The sequence of the workflows, each chunk, and each thread of chunks may be stored at the user computer and the server computer according to the time series.

At step 810, the one or more chunks are evaluated. For example, the evaluating creates one or more inferred actions using the contents and/or contexts corresponding to the one or more workflows. In some embodiments, individual contributor (IC) coaching component 112 can evaluate and/or create the one or more inferred actions, and the one or more inferred actions may be a coaching instruction, messages, notifications, or alerts that are presented in or over applications or services that the user computer is executing. In some embodiments, the one or more inferred actions may be determined from the contents and/or contexts of a particular chunk and/or a particular time series associated with the chunk and/or one or more workflows. In some embodiments, the one or more inferred actions may be artificial intelligence (AI) based actions and include one or more of AI coaching recommendations, messages, notifications, alerts, and/or a combination thereof.

In some embodiments, one or more prompts may be created based on the inferred actions and, for example, the LKE 706 may output the inferred actions along with the prompts to the user computer to automate the one or more workflows of the user. In some embodiments, an order of the inferred actions and the prompts may be determined that is helpful for a user to effectuate improvements to the one or more workflows. In some embodiments, the inferred actions and/or prompts may be displayed on a display device of the user's computer in the determined order. For example, a prompt may be a message displayed to a user via a display device of a user computer asking the user to provide information or perform a specific interaction with an application or platform that may improve a user's efficiency and/or use of the application or platform, thereby improving a relevant workflow associated with the user and those applications and/or platforms.

In some embodiments, one or more queries specifying one or more particular chunk(s), including the related content and context, and/or one or more particular time series of workflow(s) may be received by LKE 706 from a user via a user computer or from one or more other users of other user computers. Contents and/or contexts corresponding to the particular chunk(s) and/or the particular time series may be retrieved and one or more inferred actions and/or prompts as described for step 810 may be determined.

At step 812, one or more subsequent workflows of the user are automated according to one or more of the inferred actions. In some embodiments, the automation of the one or more subsequent workflows provides automatic management of a workflow such that applications and/or platforms of the one or more subsequent workflows interacted with by a user provide content, options, and/or functionality in accordance with the one or more inferred actions. In some embodiments, a user may indicate acceptance of the automation of step 812 via the user computer, or may instead reject the automation of step 812 and instead implement adjustments to subsequent workflows themselves based on the recommendation(s) provided by LKE 706. In some embodiments, the automated management may automatically trigger one or more applications coupled over one or more accessibility APIs based on the inferred action(s). In some embodiments, one or more new workflows many be predicted by LKE 706 based on one or more of a type and profession identification of the user, user interactions, user actions in relation to applications and/or platforms, and/or the one or more of the inferred actions. In some embodiments, one or more of steps 806 through 812 may be performed by instruction application 222 that obtains information from LKE 706 and performs the functionality described herein with respect to steps 806 through 812, and/or performs the functionality described herein with respect to instruction application 222 in relation to FIG. 2 using the information from LKE 706.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable storage media storing one or more sequences of instructions which, when executed using one or more processors of a computer, cause the one or more processors to execute:

monitoring, using one or more extractor application programming interfaces (APIs), a plurality of streams of digital data associated with user interactions with one or more different applications or platforms of the computer, each of the plurality of streams including data representing one or more events or activities associated with the user interactions;

extracting contents and contexts from the plurality of streams using the one or more extractor APIs;

determining one or more workflows represented in the user interactions, the one or more workflows including the extracted contents and contexts, the workflows indicating the user interactions with the computer during a time series comprising a plurality of timestamps associated with times at which the user interactions with the computer occurred;

storing the one or more workflows at a user computer;

determining, from the one or more workflows, one or more chunks of the one or more workflows, based on the plurality of timestamps, each chunk corresponding to a subpart of one of the one or more workflows and corresponding to a set of the plurality of timestamps associated with the subpart, each chunk including the content and contexts of the one or more workflows associated with the set of the plurality of timestamps;

evaluating the one or more chunks to infer, by the computer, one or more inferred actions using the content and contexts of the one or more workflows associated with the set of the plurality of timestamps; and automating one or more subsequent workflows associated with a user based on the one or more inferred actions.

2. The one or more non-transitory computer-readable storage media of claim 1, wherein the user interactions with the computer include user engagement and attendance associated with calendar events, meetings, email conversations, reviewing, presentations, uniform resource locators (URL) links, conferences, video streams, studying materials, blogs, work applications, non-work applications, active interactions, inactive interactions, or application programs.

3. The one or more non-transitory computer-readable storage media of claim 1, wherein the one or more extractor APIs comprise one or more Ally-tree-based extractors, OAuth-based extractors, and extractors based on optical character recognition (OCR), or extractors based on automatic speech recognition (ASR).

4. The one or more non-transitory computer-readable storage media of claim 1, further comprising sequences of instructions which, when executed using the one or more processors of a computer, cause the one or more processors to execute:

receiving one or more queries specifying a particular chunk;

retrieving content and context associated with the particular chunk; and evaluating the particular chunk using the retrieved content and context associated with the particular chunk, the evaluating creating one or more inferred actions associated with the particular chunk.

5. The one or more non-transitory computer-readable storage media of claim 1, further comprising sequences of instructions which, when executed using the one or more processors of a computer, cause the one or more processors to execute determining an order by which the one or more inferred actions are displayed on a display device of the computer.

6. The one or more non-transitory computer-readable storage media of claim 5, further comprising sequences of instructions which, when executed using the one or more processors of a computer, cause the one or more processors to execute displaying the inferred actions on a display device of the computer according to the determined order.

7. The one or more non-transitory computer-readable storage media of claim 1, wherein the one or more inferred actions include a coaching instruction of message.

8. The one or more non-transitory computer-readable storage media of claim 1, further comprising sequences of instructions which, when executed using the one or more processors of a computer, cause the one or more processors to execute the automating of the one or more subsequent workflows by automatically triggering one or more applications coupled over accessibility APIs based on the one or more inferred actions.

9. The one or more non-transitory computer-readable storage media of claim 1, further comprising sequences of instructions which, when executed using the one or more processors of a computer, cause the one or more processors to execute predicting one or more new workflows based on the one or more of the inferred actions.

10. The one or more non-transitory computer-readable storage media of claim 1, further comprising sequences of instructions which, when executed using the one or more processors of a computer, cause the one or more processors to execute the automating of the one or more subsequent workflows associated with the user based on the one or more inferred actions by automatic management of the one or more subsequent workflows such that an application of the one or more subsequent workflows interacted with by the user provides functionality in accordance with the one or more inferred actions.

11. A computer-implemented method, executed using a computer comprising one or more processors and one or more non-transitory computer-readable storage media storing one or more sequences of instructions, the method comprising:

monitoring, using one or more extractor application programming interfaces (APIs), a plurality of streams of digital data associated with user interactions with one or more different applications or platforms of the computer, each of the plurality of streams including data representing one or more events or activities associated with the user interactions;

extracting contents and contexts from the plurality of streams using the one or more extractor APIs;

determining one or more workflows represented in the user interactions, the one or more workflows including the extracted contents and contexts, the workflows indicating the user interactions with the computer during a time series comprising a plurality of timestamps associated with times at which the user interactions with the computer occurred;

storing the one or more workflows at a user computer;

determining one or more chunks of the one or more workflows, each chunk corresponding to a subpart of one of the one or more workflows and corresponding to a set of the plurality of timestamps associated with the subpart, each chunk including the content and contexts of the one or more workflows associated with the set of the plurality of timestamps;

evaluating the one or more chunks, the evaluating creating one or more inferred actions using the content and contexts of the one or more workflows associated with the set of the plurality of timestamps; and automating one or more subsequent workflows associated with a user based on the one or more inferred actions.

12. The computer-implemented method of claim 11, wherein the user interactions with the computer include user engagement and attendance associated with calendar events, meetings, email conversations, reviewing, presentations, uniform resource locators (URL) links, conferences, video streams, studying materials, blogs, work applications, non-work applications, active interactions, inactive interactions, or application programs.

13. The computer-implemented method of claim 11, wherein the one or more extractor APIs comprise one or more Ally-tree-based extractors, OAuth-based extractors, and extractors based on optical character recognition (OCR), or extractors based on automatic speech recognition (ASR).

14. The computer-implemented method of claim 11, further comprising:

receiving one or more queries specifying a particular chunk;

retrieving content and context associated with the particular chunk; and evaluating the particular chunk using the retrieved content and context associated with the particular chunk, the evaluating creating one or more inferred actions associated with the particular chunk.

15. The computer-implemented method of claim 11, further comprising determining an order by which the one or more inferred actions are displayed on a display device of the computer.

16. The computer-implemented method of claim 15, further comprising displaying the inferred actions on a display device of the computer according to the determined order.

17. The computer-implemented method of claim 11, wherein the one or more inferred actions include a coaching instruction of message.

18. The computer-implemented method of claim 11, wherein the automating of the one or more subsequent workflows includes automatically triggering one or more applications coupled over accessibility APIs based on the one or more inferred actions.

19. The computer-implemented method of claim 11, further comprising predicting one or more new workflows based on the one or more of the inferred actions.

20. The computer-implemented method of claim 11, wherein the automating of the one or more subsequent workflows associated with the user based on the one or more inferred actions includes automatic management of the one or more subsequent workflows such that an application of the one or more subsequent workflows interacted with by the user provides functionality in accordance with the one or more inferred actions.

\* \* \* \* \*